United States Patent
Rusnica et al.

[11] Patent Number: 5,859,885
[45] Date of Patent: Jan. 12, 1999

[54] INFORMATION DISPLAY SYSTEM

[75] Inventors: Leigh Ann Rusnica, hempfield; Steven Paul Kerch, Monroeville; Vaughn M. Thomas, Penn Township; Stephen Joseph Kenney, Halfmoon Township; Charles Stillwell Brockhoff, Jr., Plum Borough; Bert C. Morris, Unity Township; Emilie Matarasso Roth, Beechview; Nobuo Sugibayashi, Monroeville, all of Pa.

[73] Assignee: Westinghouse Electric Coporation, Pittsburg, Pa.

[21] Appl. No.: 977,364

[22] Filed: Nov. 24, 1997

Related U.S. Application Data

[60] Provisional application No. 60/031,618 Nov. 27, 1996.

[51] Int. Cl.[6] .................................................. G21C 17/00
[52] U.S. Cl. .......................... 376/259; 376/216; 340/525; 702/185
[58] Field of Search ..................... 376/216, 259; 364/188, 528.21, 528.22; 340/506, 517, 521, 524, 525, 852.06; 702/183, 185

[56] References Cited

U.S. PATENT DOCUMENTS

| | | | |
|---|---|---|---|
| 4,552,718 | 11/1985 | Impink, Jr. et al. | 376/216 |
| 4,803,039 | 2/1989 | Impink, Jr. et al. | 376/216 |
| 4,816,208 | 3/1989 | Woods et al. | 376/259 |
| 5,068,080 | 11/1991 | Impink, Jr. et al. | 376/215 |
| 5,089,978 | 2/1992 | Lipner et al. | 364/188 |
| 5,253,186 | 10/1993 | Lipner et al. | 376/216 |
| 5,265,131 | 11/1993 | Scarola et al. | 376/259 |
| 5,351,200 | 9/1994 | Impink, Jr. | 376/216 |
| 5,353,315 | 10/1994 | Scarola et al. | 376/259 |
| 5,361,198 | 11/1994 | Harmon et al. | 376/216 |
| 5,375,150 | 12/1994 | Scarola et al. | 376/216 |

OTHER PUBLICATIONS

The 1996 American Nuclear Society International Topical Meeting on *Nuclear Plant Instrumentation Control, and Human–Machine Interface Technologies*, vol. Two, pp. 1385–1395, Gutierrez et al.; May 6–9, 1996.

Proceedings of the Human Factors Society–32nd Annual Meeting–1988, *Significant Messages; An Integrated Display Concept*, pp. 13501354, David D. Woods and Glenn Elias.

IEEE Transactions on Systems, Man, and Cybernetics, vol. 22, No. 4, Jul./Aug., 1992, *Ecological Interface Design: Theoretical Foundations*, pp. 589–606, K. Vicente and J. Rasmussen.

Cognitive Engineering Laboratory, Final Grant Report, Dec., 1995, *Physical and Functional Displays in Process Supervision Control*, 74 pages, C. Burns and K. Vicente.

*Primary Examiner*—Daniel D. Wasil

[57] ABSTRACT

A functional approach to an information display system that enables a fast and easy understanding of the status of a complex process. The display screen is organized by process goals. Each process goal is then tied to a number of process objectives which directly relate individually to the goals. The objectives are in turn tied to the process functions which must be substantially maintained in order to achieve the respective objectives. A display of control functions related to each process function is mapped onto the regional displays. The individual display elements use a combination of coded background color, border color and other indicia of information, e.g., mimics, meters, etc. to present a significant amount of information about the status of the process and its components in a manner that is readily absorbed and easily understood.

52 Claims, 11 Drawing Sheets

INFORMATION DISPLAY SYSTEM

This application claims the priority of provisional application Ser. No. 60/031618 filed Nov. 27, 1996.

BACKGROUND OF THE INVENTION

1. Field of the Invention

The present invention relates generally to a display system for understanding the status of a complex process and its components, and more particularly, to a system that presents a large quantity of information in a manner that is readily absorbed and easily understood.

2. Background Information

Fault management, the identification of and response to abnormal conditions, is a major component of a humans role in many complex tactical environments such as process control, flight decks and air traffic control. Operational history, design reviews and evaluation studies have shown a large number of major deficiencies with traditional systems, particularly with respect to the operator's role. The deficiencies are rarely due to a lack of alarm data; rather, they are the result of problems in finding and integrating the relevant data out of a much larger set.

The significance of data problem represents an inability to find, integrate, or interpret the "right" data at the "right" time (e.g., critical information is not detected among the ambient data load, or not assembled from data distributed over a time or space, when not looked for due to misunderstandings or erroneous assumptions). This problem occurs in situations where a large amount of potentially relevant data must be sifted to find the significant subset for the current context. In other words, most information handling problems are not due to a lack of data but rather due to an overabundance of unorganized data.

Operational staff members in dynamic process environments must detect, evaluate and respond to abnormal conditions. Traditionally, operators must sift through large numbers of what are traditionally called "alarm" messages to find and identify the abnormal conditions that are indicated by "alarms". Conventional data display systems complicate the operator's task by producing alarm signals which are triggered when signals cross threshold crossing type events which provide weak evidence with respect to underlying abnormal conditions. The alarms are organized according to system thereby requiring the operator to understand the relationships between components in various systems and the multiple functions they perform to determine whether the triggering events indicate an abnormality and where that abnormality might be occurring. Conventional display systems presentation methods range from completely parallel to totally serial. The parallel presentation systems complicate the operator's task because of the amount of information presented can overwhelm the operator, even though there are advantages in presenting all information at once. On the other hand, the serial presentation systems limit the number of messages, yet complicate the operator's integration problem because the operator must scan a long list of information one display page at a time to ferret out the relevant ones. The task of the operators in interpreting the evidence provided by these weak "alarms" is difficult because (a) the meaning of a particular alarm message depends on context, for example, plant mode, message history and the status of other messages and (b) the individual alarm messages must be selected and integrated to access process status since each message is only a partial and indirect indicator of an abnormality. Operator performance literature is full of cases where operators failed to correctly find, integrate, and interpret typical alarm messages in order to identify and respond to disturbances.

Failure to recognize the above-discussed problems has lead to the development of a number of computerized display systems which in many cases fail to improve the situation and in some instances can even exacerbate the system deficiencies because of a proliferation of types and degrees of displays. U.S. Pat. No. 4,816,208 issued Mar. 28, 1989, and assigned to the assignee of this application, describes a number of these prior art display systems.

The conventional approach for alarm systems used in nuclear power plants is to employ devices such as level sensors, flow sensors and valve position sensors to monitor the power plant. The outputs produced by these indicators are evaluated by signal monitoring units which include threshold or set point detectors. Each detector monitors a single sensor and produces an alarm signal that provides weak evidence of an abnormality. For example, an alarm in this type of system might signal that a valve is closed. Under one set of plant conditions, this valve position may be abnormal, i.e., no flow even when the system of which the valve is a part should be on. Under other conditions, it may not indicate an abnormality. The sensor signals are generally organized along system lines that reflect how components are arranged and are presented on the display grouped according to such systems. The display typically consists of backlit annunciator tiles each having a fixed wording message, and presents all of the "alarms" in parallel according to the system groupings. Each time a monitored piece of equipment crosses a threshold, a tile is turned on or off indicating that the threshold was crossed. In such a system, there is a problem in integrating these kinds of alarms into an overall understanding of plant state. The parallel presentation via the tiles theoretically allows the operator to get a "picture" of the operation of the entire system, yet it can overwhelm the operator when a major system disturbance occurs.

The aforereferenced U.S. Pat. No. 4,816,208, goes on to describe a number of other prior art systems that have tried to deal with the manner of organizing and presenting data to the operator of a complex process in a manner that can be readily absorbed and easily understood. The cited patent uses an intelligent rule based process to produce abnormality indicators which provide strong evidence of the problem. The abnormality indicators are organized according to function of the process and the alarms are sorted relating to violations of the goals of the function disturbances the process currently accomplishing the goals is experiencing and unavailability of the processes which could be used to achieve the goal. The messages are presented on a parallel display divided according to function and within each function by goal violation, process disturbance and process unavailability. The arrangement significantly simplified the presentation to the operator, however it still left room for improvement.

Accordingly, it is an object of this invention to further improve the organization and presentation of information within a display of a complex process to focus the operator on the information needed for any action required in an efficient manner.

SUMMARY OF THE INVENTION

An object of the present invention is to provide an information display system for a complex process that does not overwhelm the operator with information and alarms, but alerts the operator to underlying abnormalities in the process and the status and condition of components to the process.

It is another object of the invention to present information in a manner that is easily assimilated and focuses the operator on underlying causes for any abnormality.

It is another object of the present invention to prompt the operator that a change in the display is desirable to relate additional information pertinent to a current plant condition, but under normal operation does not change the display until authorized by the operator.

The above objects among others are achieved by an information display system that organizes the display of information by process goals. The system employs regional displays associated with process functions, which must be substantially maintained in order to achieve the associated goals for the operating process. The system also provides display elements for presenting information relevant to control functions related to each process function and its associated goal, mapped onto the regional display as overlying display elements.

In one embodiment, the process goals are organized on the display by process objectives. The process objectives are the desired end results of the process.

In another embodiment, less than all of the overlying display elements are prominent at a time under most operating conditions. Some display elements present multiple packets of information through the use of color coded backgrounds, borders and graphics such as meters.

At least one grouping of the regional displays is associated with a process objective that the goals correspond to. In an application to a nuclear power generating facility, for example, a first objective would be to generate electricity, while a second objective would be to contain the release of radiation. A separate section of the overall display can be directed to auxiliary systems, procedures overview, plant timeline and operator configurable segments.

The information system can work in combination with multiple operator workstations having cursors in the information system display corresponding to each workstation wherein each cursor is unique to the workstation. A priority ranking can be established to determine which command takes precedent when mutually exclusive commands are initiated by multiple workstations.

These, together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The preferred embodiment of this invention is applied to an information display system of a control room for a pressurized water reactor electrical power generating plant. A fundamental principle of this invention is the separation of process observation from control function. This represents a departure from the traditional approach taken in control room design, in which the controls and information sources are integrated in a single model of the plant and generally organized to mimic the physical layout of the plant. The primary role of the information display system of this invention is to support observation of the plant state (a functional approach to the organization of information in the display of plant state, process parameters, process alignment and supporting system status).

Figure 1:
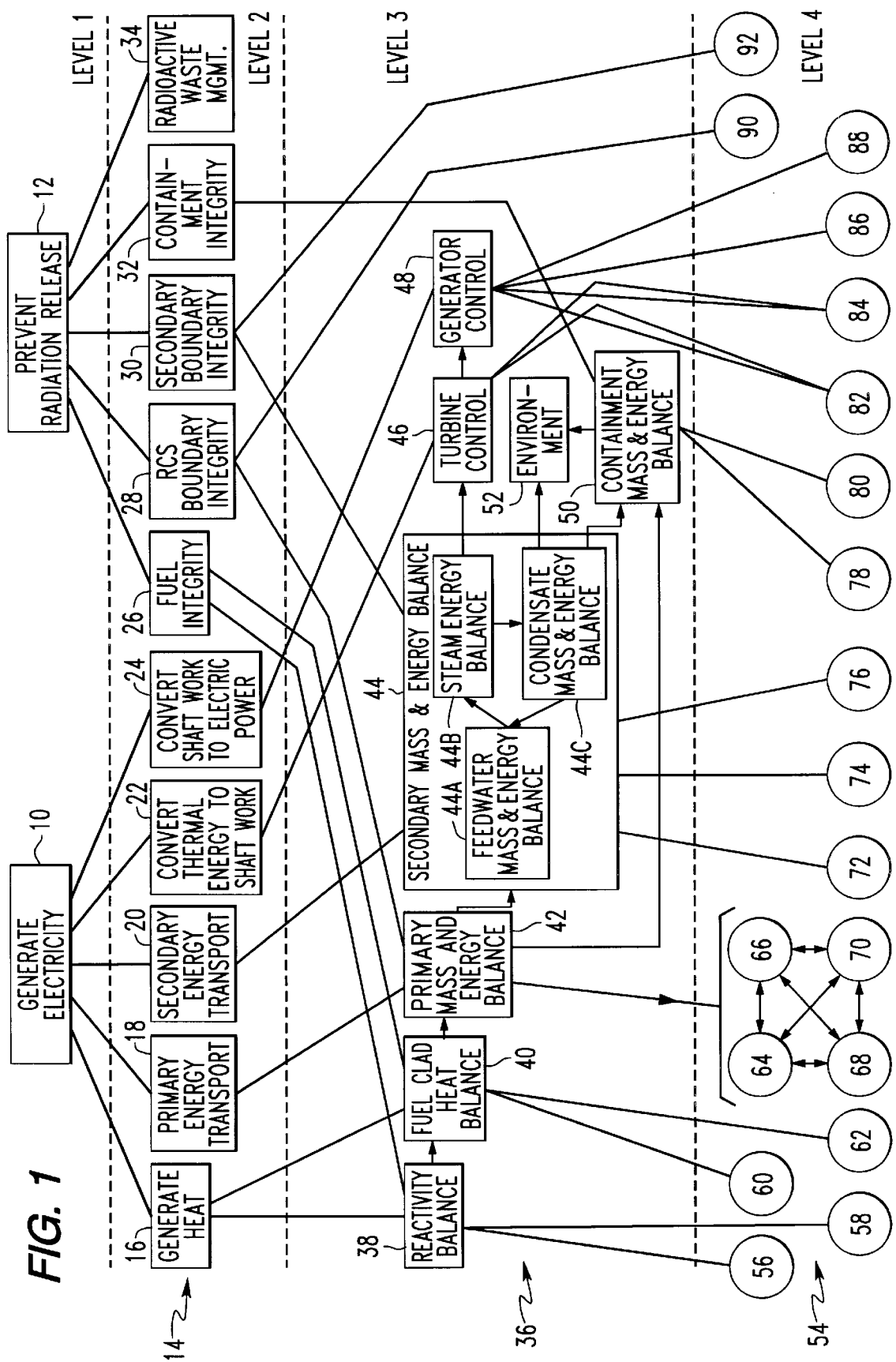
FIG. 1 is a flow chart of a functional decomposition of the top four levels of the operating process for normal power operation of a pressurized water reactor.

The framework for the information presented in the information display is based on a functional (goal-means) decomposition of the objectives sought to be achieved in the operation of a pressurized water reactor. FIG. 1 shows this hierarchical, structured representation of plant processes.

Level 1 represents the two principal goals of plant operation; Generating Electricity, represented by block 10, and Preventing Release Of Radiation, represented by block 12. Level 2 decomposes these two goals, 10 and 12, into ten processes 14 that in turn form a set of goals that define the functions which must be maintained to provide safe and efficient power production. The Level 2 processes 14 tied to the level 1 safety goal 12 can be shown to encompass the five Safety Parameter Display System functions and are continuously displayed. The Level 2 processes tied to the Level 1 Preventing Release Of Radiation goal are Fuel Integrity 26, Reactor Coolant System Boundary Integrity 28, Secondary System Boundary Integrity 30, Containment Integrity 32, and Radioactive Waste Management 34. The Level 2 processes tied to the Level 1 power production goal 10, are also continuously displayed. The five Level 2 processes tied to the Level 1 power production goal are to Generate Heat 16, Primary Energy Transport 18, Secondary Energy Transport 20, Convert Thermal Energy To Shaft Work 22, and Convert Shaft Work To Electric Power 24.

The Level 2 processes 14, in turn provide ten goals that are further decomposed into eight Level 3 processes 36 that define the mass-energy transport through the plant required to meet the overall Level 1 safety and power production goals 10 and 12. The eight Level 3 processes, 36, are Reactivity Balance 38, Fuel Clad Heat Balance 40, Primary Mass And Energy Balance 42, Secondary Mass And Energy Balance 44, Turbine Control 46, Generator Control 48, Containment Mass And Energy Balance 50, and Environmental Releases 52. Within that grouping, the Secondary Mass And Energy Balance 44 is broken down into three distinctive components; Feedwater Mass And Energy Balance 44a, Steam Energy Balance 44b, and Condensate Mass And Energy Balance 44c. These processes correspond to specific plant processes which must be controlled in order to meet the Level 2 goals. Consequently, the eight Level 3 processes 36 correlate in concept and scope to the major plant equipment elements of a traditional physical plant mimic (pictorial display of the arrangement of various plant components). While the use of a pure physical mimic as the basis for the information display system would provide a context familiar to most operations personnel, it is limited in its ability to effectively and concisely show interrelationships and interactions between plant processes.

The Level 3 processes, in turn, provide eight goals that are further decomposed into 19 Level 4 processes, illustrated in FIG. 1 by reference character 54, that define the major control functions for the plant. The Level 4 functions could be used directly as the basis for summary displays, but would not provide clear, spatial context consistent with the mental model of most operations personnel. The 19 Level 4 processes, 54, are: Control Of Gross Reactivity 56; Control Of RCS (Reactor Coolant System) Boron Concentration 58; Control Of Fuel And Clad Temperature 60; Control Of Local Reactivity 62; Control Of RCS Coolant Temperature 64; Control Of RCS Coolant Pressure 66; Control Of RCS Water Mass Inventory 68; Providing RCS Coolant Flow 70; Control Of Main Steam Pressure 72; Control Of Steam Generator Water Inventory 74; Control Of Condenser Pressure 76; Control Of Containment Pressure 78; Control Of Containment Temperature 80; Hydraulic Control 82; Lubrication 84; Control Of Generator Temperature 86; Providing Generator Exciter Current 88; Primary Boundary Corrosion Control 90; and Secondary Boundary Corrosion Control 92.

To exploit the relative strengths of the physical and functional representational schemes, a hybrid approach has been adopted for the design of the information display of this invention. The display is structured to parallel the functional decomposition (Levels 2, 3, and 4 depicted respectively by reference characters 14, 36, and 54 in FIG. 1). The display includes:

- Safety and power production summary boxes (based on Level 2 goals 16, 18, 20, 22, 24, 26, 28, 30, 32, and 34, to summarize plant status)
- Display group silhouettes depicting major plant components in a physical mimic (based on Level 3 processes 38, 40, 42, 44, 46, 48, and 50, to aide operators in locating function and process information)
- Control function summary boxes overlaid on the display group silhouette (based on Level 4 processes 54 to summarize function status)
- Process parameter, process alignment, supporting system status, and alarm display elements overlaid on the display group silhouettes (to provide evidence for the state of the associated control function indicators and indication of the direction in which the process parameters are trending and the rate at which they are moving).

The information displayed on the plant overview portion of the display system of this invention in this particular embodiment is two-thirds of the total display, which aids the control room crew in:

1. Monitoring the satisfaction of goals for all functions that are applicable for the range of plant operating conditions that the process is undergoing. For those parameters that are most important, it is desirable to also monitor the margin to dissatisfaction of the goals. Goals include safety limits and operational targets.
2. Maintaining awareness of the consequences of dissatisfaction of functional goals by providing direct navigation from the information display screen to more detailed information at the operator's workstation.
3. Maintaining awareness of the available processes supporting each applicable functional goal by presenting operational status. This includes processes that are available and operating, processes that are available and in standby, and processes that are normally available, but are currently out of service.
4. Maintaining awareness of the status of automated/automatic process control systems. For example, in cases where a system has many modes of operation (steam dumps; manual, automatic-temperature mode, automatic-pressure mode), the current mode is indicated. Indication is also provided for instances where there is a disagreement between the demanded signal and the actual signal for a process.

These four objectives were developed into the following three criteria used to evaluate information needs for each Level 4 control function characterized by reference character 54:

1. Monitor the satisfaction (and the margin to dissatisfaction) of functional goals. If actuated, monitor performance of the reactor trip and engineered safety features related to the function.
2. Maintain awareness of the available processes and systems/components supporting the functional goals.
3. Maintain awareness of the processes and systems/components impacting/influencing the function.

Applicability matrices mapping systems/modes, control functions/modes, and systems/control functions are used to enhance understanding of the scope and interdependencies of display groups, and to provide additional justification for selection of information to be presented on the display screen.

Figure 2:
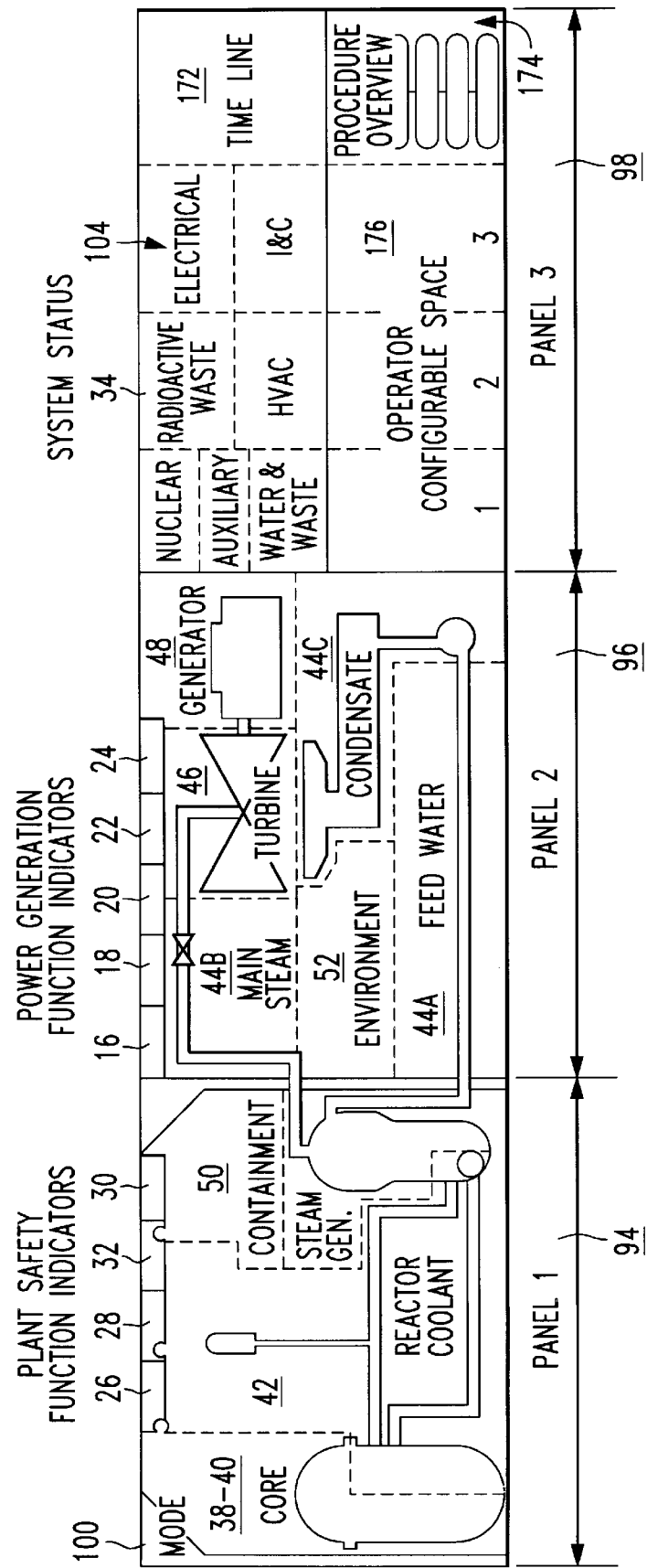
FIG. 2 is a schematic drawing of three regional display groupings of the information display system of this invention.

FIG. 2 depicts the general display layout for a three panel display unit incorporating the principals of this invention. Display of plant mimic, parameter summary, alarms, and equipment status information are allocated to panels 1 and 2. A left-to-right top-to-bottom prioritization is used to present information in order of importance, level of detail and process flow (source to sink). This is consistent with the normal reading pattern for written English.

Figure 3:
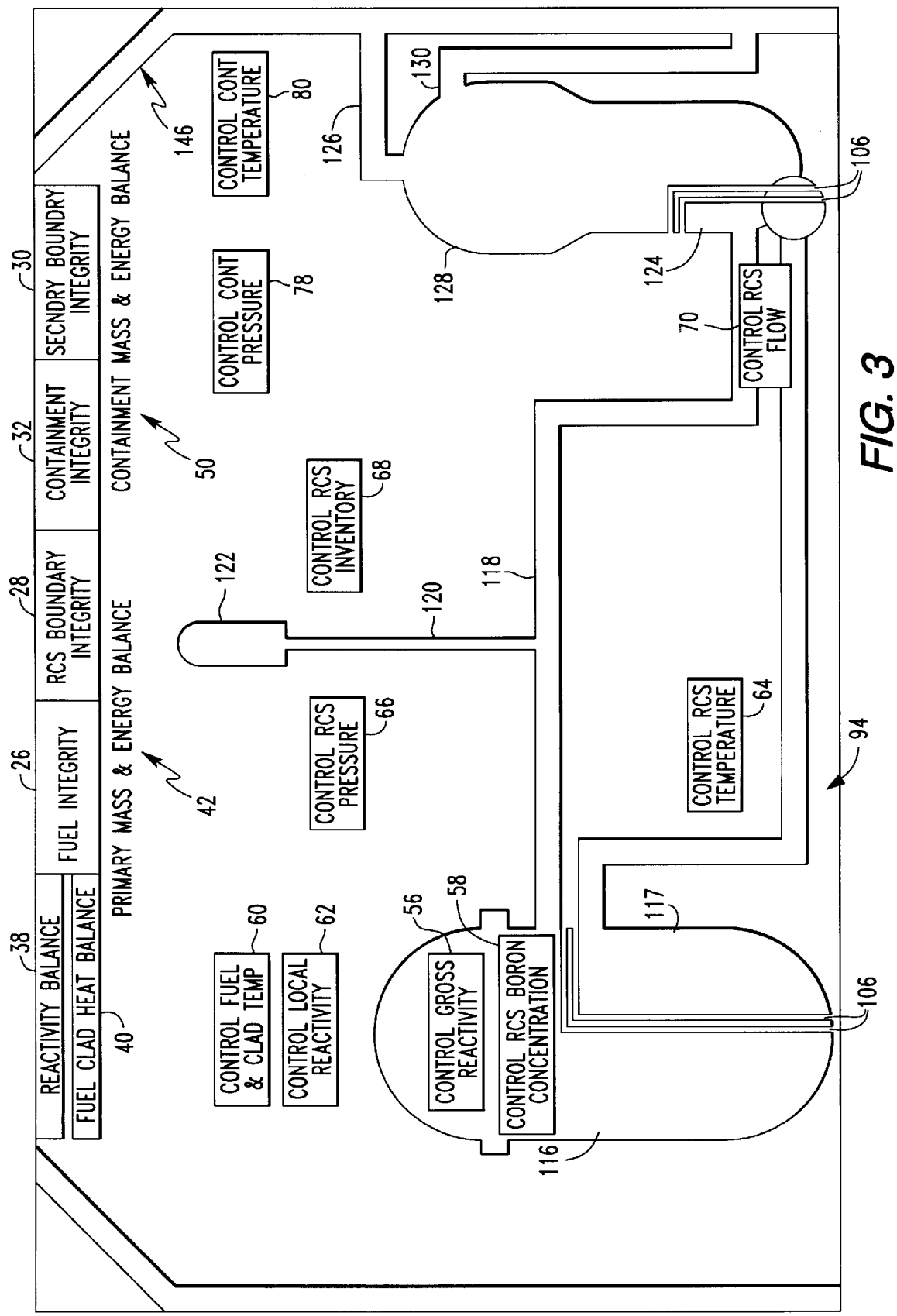
FIG. 3 is a schematic illustration of the regional displays primarily associated with the objective of containing the release of radiation illustrated as the first grouping of goals in FIG. 1.

A Plant Mode Indicator 100 and "First Out Message" 102 are presented in the upper, left-hand corner of FIG. 3, which is a more detailed representation of panel 1, reference character 94, shown in FIG. 2. The Plant Mode is the state of the plant as defined by the Plant Technical Specifications, e.g., Power Operation, Startup, Hot Standby, Safe Shutdown, Cold Shutdown, Refueling, etc. The First Out Message is the first plant parameter that initiated a reactor trip or safety injection signal. The Level 2 safety functions 26, 28, 32, and 30 corresponding to Fuel Integrity, RCS Boundary Integrity, Containment Integrity and Secondary Boundary Integrity, are represented as summary status boxes at the top of FIG. 3. The Radioactive Waste Management safety function 34 in this embodiment is mapped into the Support System Status Display 104 shown in FIGS. 2 and 5, since this function is not normally resident in the main control room. The Level 2 power production functions to Generate Heat 16, Primary Energy Transport 18, Secondary Energy Transport 20, Convert Thermal Energy To Shaft Work 22, and Convert Shaft Work To Electrical Power 24 are represented as summary status boxes at the top of panel 2, reference character 96, as shown in FIGS. 2 and 4.

Figure 4:
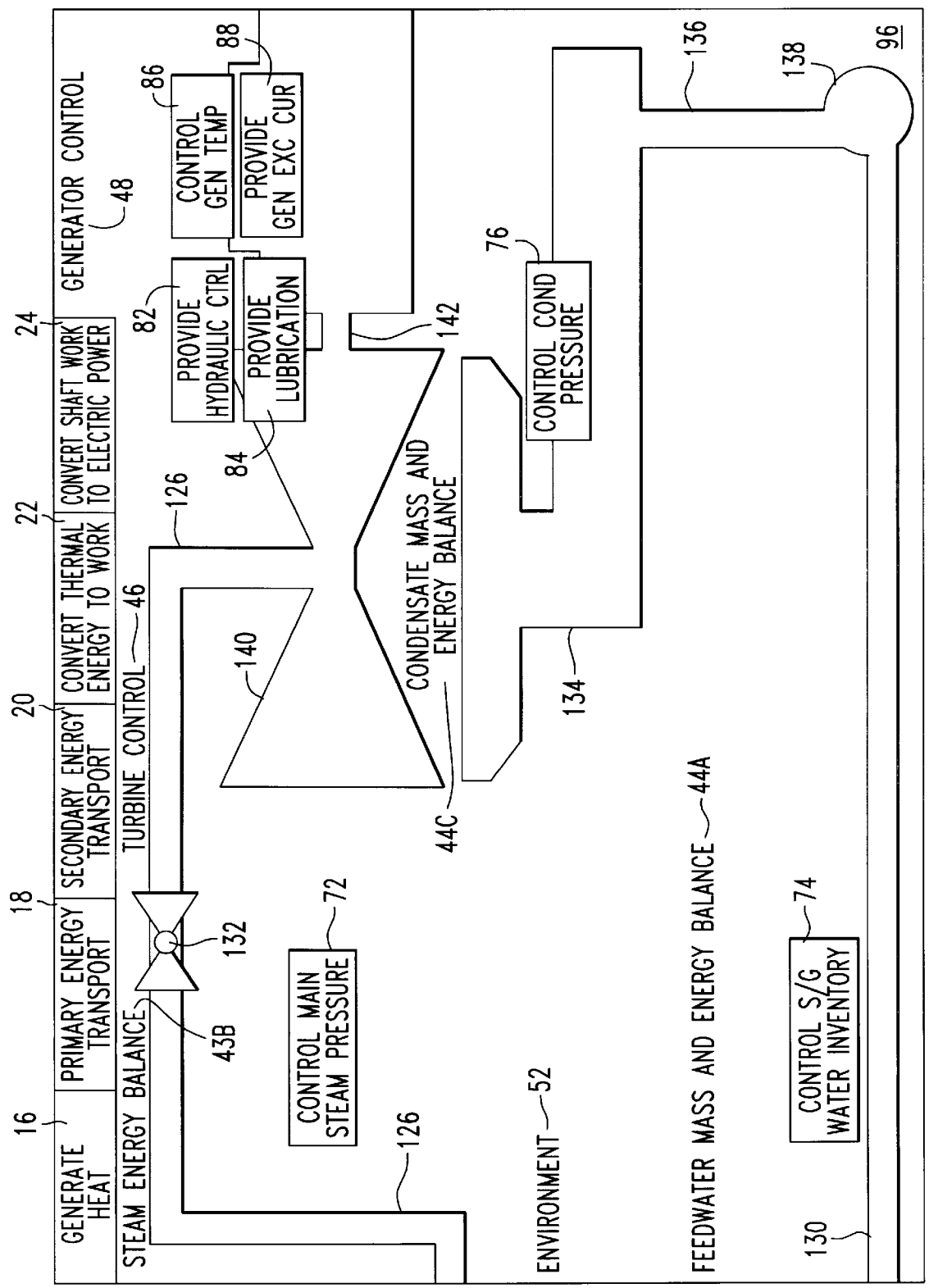
FIG. 4 is a schematic illustration of the regional displays primarily associated with the second objective to generate electricity illustrated in FIG. 1.

The Level 3 functions, 36, are represented by the display group silhouette shown in FIGS. 3 and 4. Each display group silhouette consists of two elements: a colored region which is used to define a subset of the display space allocated to a particular display group; and a portion of the simplified plant working fluid system schematic associated with the display group, which is overlaid on the colored background. This representation provides a physical mimic to aid the operating crew in locating specific information and a context for the displayed information.

Figure 5:
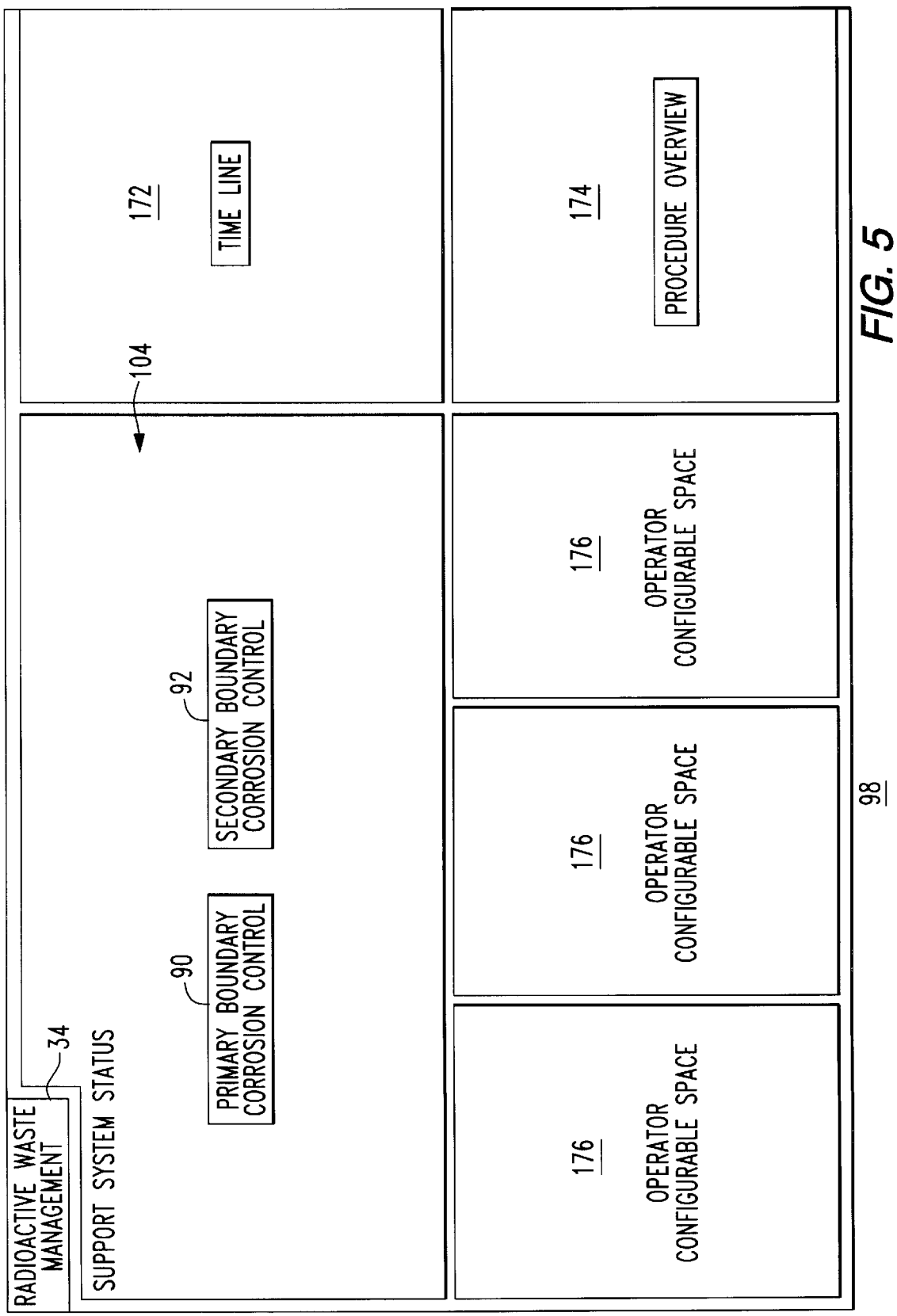
FIG. 5 is a schematic drawing of the third display grouping illustrated in FIG. 2.

The Level 4 control functions, 54, shown in FIG. 1 are mapped onto the display silhouettes in FIGS. 3 and 4 and the Support System Status display 104 in FIG. 5. The Level 4 control functions Primary Boundary Corrosion Control 90 and Secondary Boundary Corrosion Control 92 are mapped into the Support System Status Display 104 as shown in FIG. 5, since these control functions are not normally resident in the main control room. For each control function, a Level 4 function summary status box is located within the subregion of the corresponding display group silhouette as illustrated in FIGS. 3 and 4. Demarcation lines 106 are used to separate subregions within a display group silhouette if more than one control function is located within a display group silhouette as illustrated in FIG. 3.

Process parameter, process alignment, supporting system status, and alarm display elements are overlaid on the display group silhouettes to provide evidence for the state of the associated Level 4 status boxes, 54. Indication of the direction in which the process parameters are trending and the rate at which they are moving is also provided. This information can be viewed from the overlay of FIG. 3 illustrated in FIG. 6, and the overlay of FIG. 4 illustrated in FIG. 7.

Figure 8:
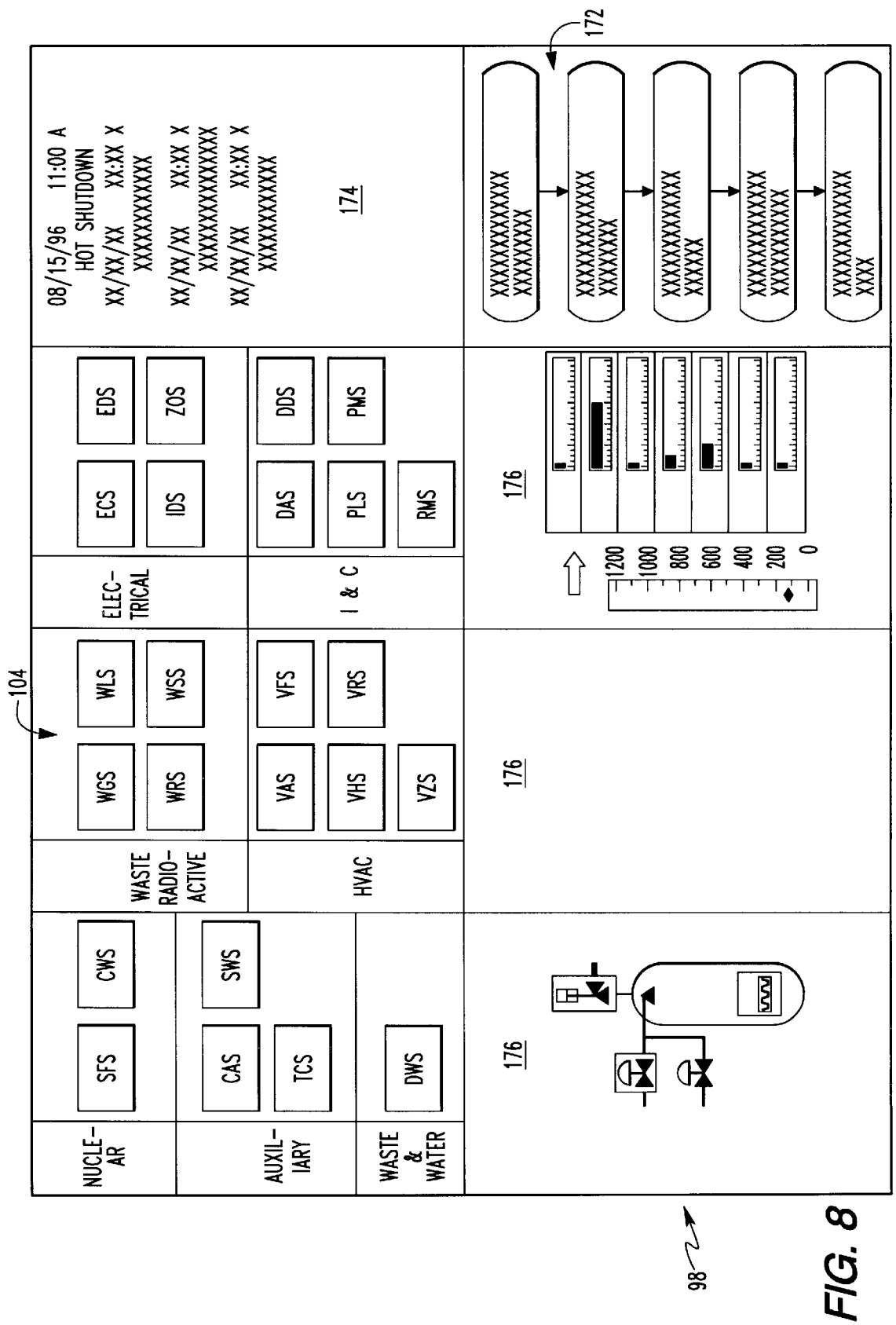
FIG. 8 is a schematic drawing showing the overlying display elements of the right hand grouping of FIG. 2.

System information that is applicable to multiple functions (Heating, Ventilation and Cooling, Compressed Air, Electrical Distribution, Instrumentation and Control, and Non-working Fluid Water Systems) is located in the Support System Status Display 104 on panel 3 represented by reference character 98 in FIG. 5 and illustrated with greater particularity in FIG. 8. Plant Schedule 172, Procedure Overview 174, and Operator Configurable Space 176 are also included on this third panel represented by reference character 98 in FIGS. 2, 5 and 8.

Figure 6:
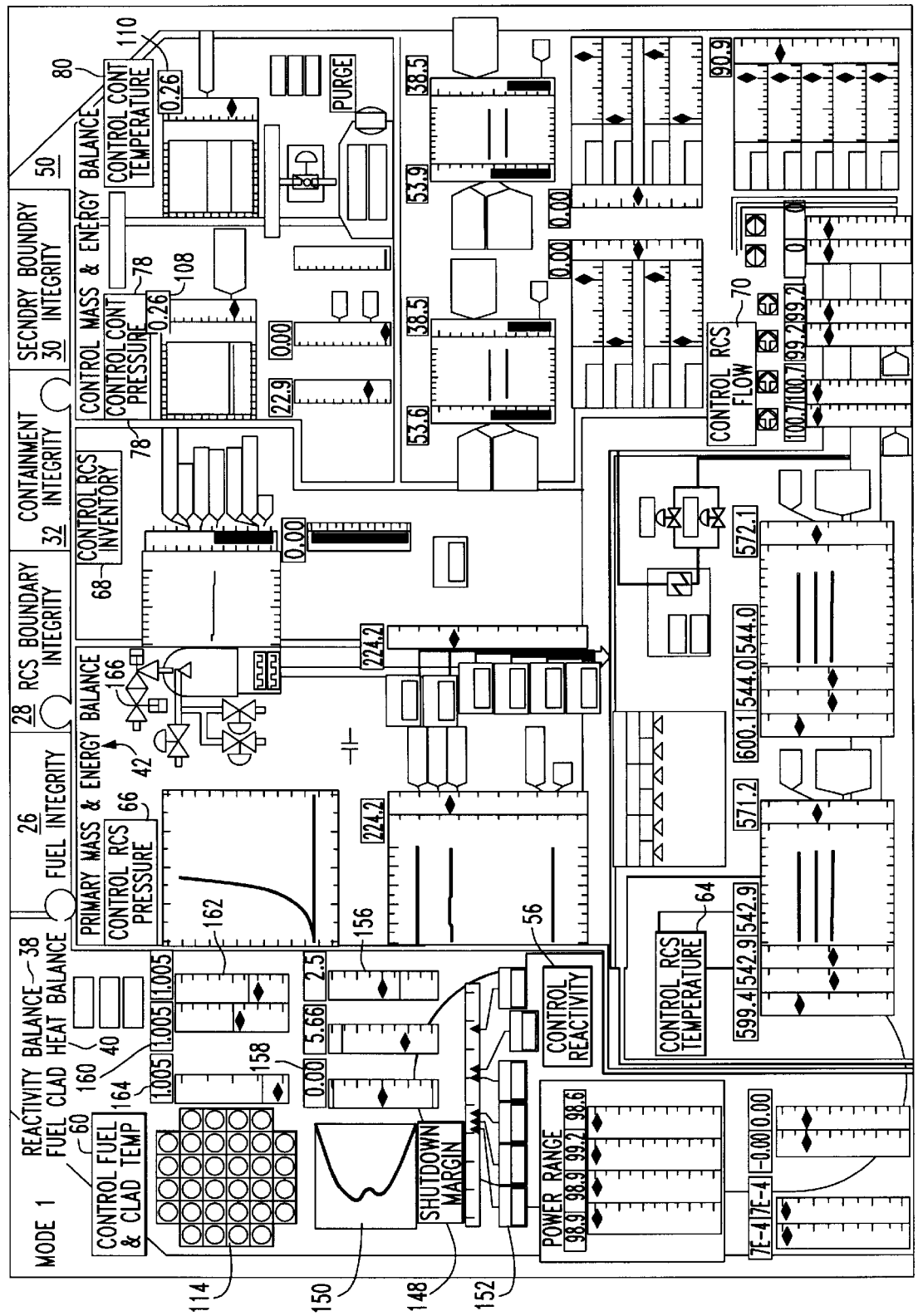
FIG. 6 is a schematic drawing showing all of the overlying display elements associated with the portion of the display illustrated in the first display section in FIG. 2.
Figure 7:
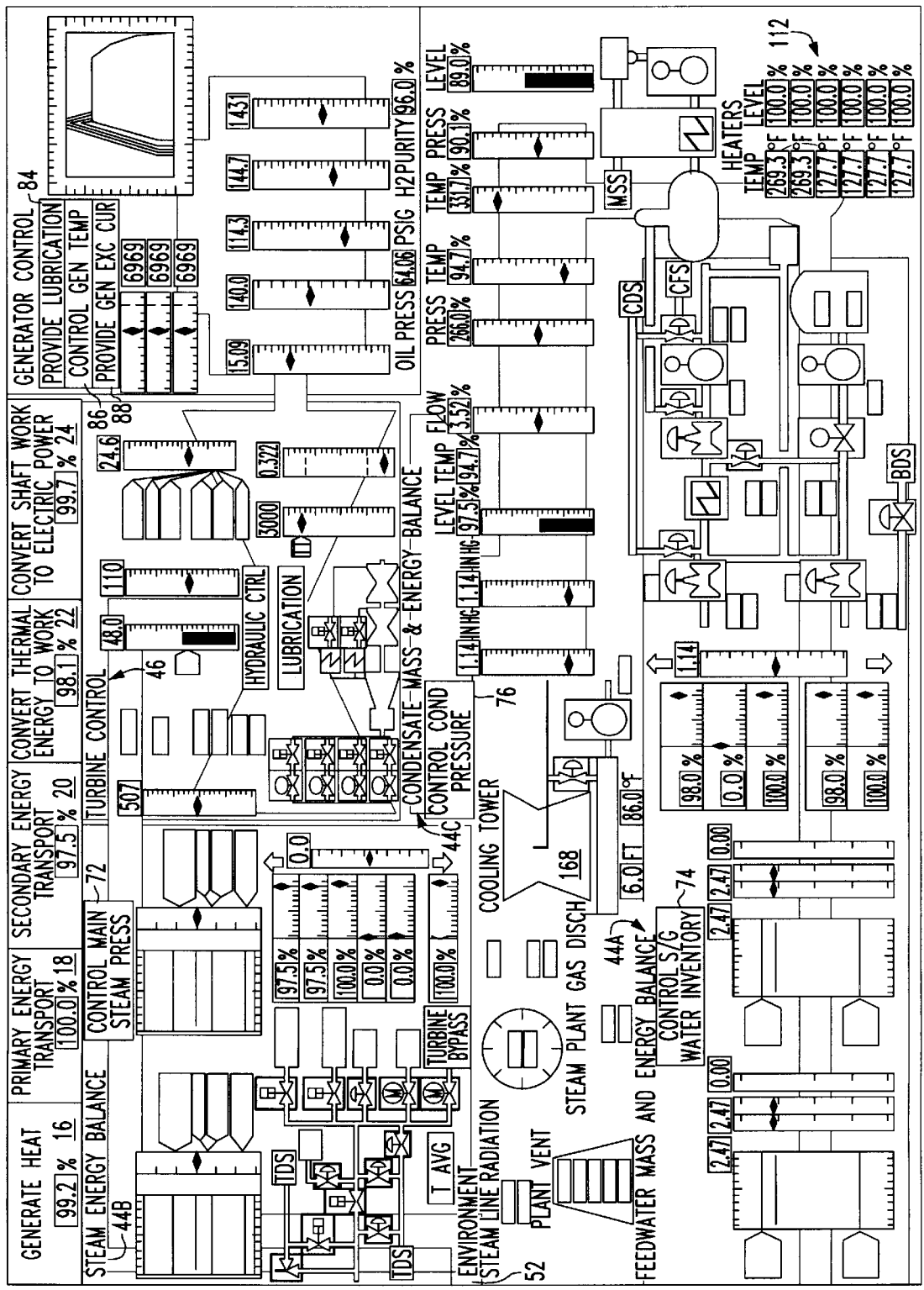
FIG. 7 is a schematic drawing showing all the overlying display elements of the middle display grouping illustrated in FIG. 2.

FIGS. 6 and 7 show the overlay of the various display elements employed by this invention. Digital display elements are used for parameters that have only one or no limits associated with them, are relatively constant or slowly changing, and for which, detection of parameter fluctuations is not critical, such as the containment pressure and temperature respectively illustrated by references characters 108 and 110 shown in FIG. 6 and the condensate heater temperature and level, 112, shown in the lower right hand corner of FIG. 7. Meters are used for those parameters for which it is important to detect variations from normal. In addition, a meter may be chosen for parameters that have multiple limits of which the operator must be aware. A standard meter employed in this design consists of a vertical or horizontal meter showing the relative location of the parameter at the current time against the meter scale and the current digital value of the meter as illustrated by the meters associated with a Process Control Reactor Coolant System Flow Display, 70, shown in the lower right hand corner of FIG. 6 and the meters associated with Condensate Mass And Energy Balance, 44c, shown just to the right off center in FIG. 7. Trends are displayed through graphical representations such as that shown under the Process Control Reactor Coolant System Pressure Display, 66, in FIG. 6, when it is important to know short term history in order to quickly detect developing abnormalities. A standard trend indicator used on the information display consists of a ten minute history of the parameter plotted on a graph, a vertical meter showing the relative location of the parameter at the current time against the meter scale, and the current digital value of the parameter. Mimics are chosen for complex systems, such as the nuclear electrical power generating system described in this embodiment, in which the relative location of components and system alignment is important, or a pictorial configuration supports a clear and rapid assessment of the process status. Summary status boxes, such as the ones used for the Level 2 goals 4, are generally chosen for functions, systems and components for which, a high level status (normal, abnormal, alarming, operating, not operating) is all that is required. The summary status box used in this example consists of a box with a name or acronym contained within the box. In addition, custom displays such as the rod control display appearing under the Primary Mass And Energy Balance Region 42 in FIG. 6, is a unique display element that is generally chosen for parameters, systems, and/or components for which a non-standard display element is desired.

Alarms are integrated into the basic display elements in several ways. Alarms that relate to major plant goals are represented as flags against the meter scales found on trends and meters. The color coding convention adopted for alarm flags is described hereafter.

In one embodiment the alarm flags are visible in the display at all times. In another embodiment the alarm flags are only visible when the system has approached or reached an abnormal operating condition. Alarms that relate to plant processes that are represented graphically (either as individual components or in mimics) or are represented as a summary status box, are coded via a change in color. Table 1 summarizes the component/mimic color-coding convention adopted in this embodiment and is described more fully later on in the text. For components, the actual operating status is graphically represented (e.g., a pump in operation will look different from the graphic for a pump not in operation). For summary status boxes, the actual status is coded by changing the outline and interior color (e.g., the summary status box for a system that is not running will be outlined in the appropriate color and the summary status box for a system running will have the interior colored an appropriate color).

TABLE 1

COMPONENT/MIMIC COLOR CODING CONVENTION

| Operating Status | Operating | | Operating | NOT Operating | | |
|---|---|---|---|---|---|---|
| Condition | Normal | Abnormal | Available — Operable | Unavailable/Inoperable | | |
| | | | | Conditions Not Met | Broken | Tagged |
| | GREEN | YELLOW | GREEN | YELLOW | RED | GRAYED-OUT |

In lieu of explicit alarm overview panels or summary panels, as has been generally employed by the prior art, the information display system of this invention provides a summary of functional alarm information through color coded changes in the Level 4 function summary status boxes. If there are any display elements within a function which have a yellow or a red alert (based on the color code conventions presented in Table 1 and described more fully hereafter), the highest priority alarm color will propagate up to the Level 4 function box. As can be appreciated by reference to FIGS. 3, 4, 5, 6, 7 and 8, a single framework is used as the backdrop of the information display system of this invention, and that various portions of the display drop out or pop in under operator control as the plant evolves through the specified modes of plant operation (e.g., startup, low power, full power, tripped, shut down, etc.).

As portions of the plant overview display shown in FIGS. 6, 7 and 8 become valid/invalid, the operator will be prompted to acknowledge that a change to the display is appropriate (excluding the post-reactor trip/safety injection scenario). Once acknowledged, the display elements are replaced with alternative, mutually exclusive display elements conveying the same kind of information but appropriate to the specific plant condition (e.g., the source range neutron flux monitors are replaced by the power range neutron flux monitors during reactor startup once the source range neutron flux monitors are deenergized, or a process parameter with multiple ranges of interest is displayed with scaling appropriate to the current plant condition).

For each display element (e.g., meter trend, component graphic, etc.), criteria are established to determine when the element is valid and should appear on the plant overview display. The criteria for each of these display elements is incorporated into the Plant Computerized Procedure System such as the system disclosed in U.S. Pat. Nos. 4,552,718; 4,803,039; 5,068,080; 5,089,978; 5,253,186; and 5,351,200, assigned to the assignee of this invention and illustrated in FIGS. 5 and 8 by reference character 174. The computerized procedures continuously monitors for the criteria to be satisfied. Once a criteria for a display element is satisfied the Computerized Procedure System alerts the operator to acknowledge that a new display element is required. Alternatively, the criteria for each display change could be incorporated in the information display system logic. In this case, once the criteria is met for an individual display element to change, pop in, or drop out (e.g., the pressure trend to rescale from narrow range to wide range, or an indication of containment sump level to appear on the display because a certain level has been reached), the information display system would provide a visual key to the operator that a change in the display is appropriate. The operator could then acknowledge the need for the display element change allowing the change to occur. A combination of these methods can also be employed.

For common display elements, such as pumps, valves, and trends, generally conventional dynamics are adopted for the displays. However, there are new display elements incorporated with dynamics which are not commonly used. For example, one display in the embodiment shown in FIG. 6 is a top view of the core illustrated by reference character 114, which shows the core exit thermocouple temperatures graphically represented through the use of different colors. This element will also dynamically indicate when there is a quadrant power tilt ratio greater than a given factor and which quadrant is the concern.

This invention provides a complex process overview information display system separate from the operator workstations which are actually employed to control the plant as more fully described in U.S. Pat. No. 5,353,315 issued Oct. 4, 1994. It is desirable for the operator to have the capability to navigate from the information display system of this invention to information presented on the operator workstations. Additionally, the focus of an operator's attention should be represented on the information display system of this invention to support team awareness of each operator's general course of action and to provide a mechanism for resolving simultaneous operator interactions with the display system.

The information display system of this invention provides the operator with the capability of directly accessing from an information system display screen the most appropriate workstation displays that will provide more detailed information about the change that is occurring or has occurred in the process. Specific types of information contained on the display screen shown in FIGS. 6, 7 and 8 will be directly linked to the workstation displays. For example, from an alarm flag associated with a meter, the operator is able to navigate directly (e.g., point and select the associated poke field to automatically navigate to the associated alarm support screen at the operator workstation. The operator is also able to navigate from a Level 4 function summary box on the information display screen of this invention to the specific functional display at the operator workstation.

All changes to the plant overview display related to changes in plant condition, are to be made manually by the Senior Reactor Operator (SRO) or Reactor Operator (RO) from their respective workstation. Guidance as to when it is appropriate to change the display will be provided to the operator through the information display system of this invention. This guidance may be provided through the use of the plant operating procedures as presented by the Computerized Procedure System. Under certain conditions, such as when the entry conditions to the emergency operating procedures (EOPs) have been satisfied, the plant overview display of this invention will be allowed to change automatically. This automatic change is deemed acceptable since the operational philosophy is that when a Reactor Trip/SI (Safety Injection) occurs, the operator is to stop current tasks and begin to complete the steps of the Emergency Operating Procedures. The automatic change will alert the operator, support the operator's task and eliminate the need to perform the additional task of changing individual display elements on the information display system when a Reactor Trip/SI occurs. Note that the conditions of a Reactor Trip/SI are continuously monitored by the Computerized Procedure System.

The plant safety function summary consists of those Level 2 functions associated with the Level 1 goal 12: Prevent Radiation Release. The status boxes for each Prevent Radiation Release Level 2 function at the top of the first grouping of regional displays shown in FIG. 3 are designed to indicate when there is a challenge to any of the Critical Safety Functions as specified in the Emergency Response Guidelines. Normally each of the status boxes are outlined in green. Under the circumstances in which there is a yellow, orange or red path alert for the Critical Safety Functions, the appropriate status box 26, 28, 30, or 32, displays the corresponding Critical Safety Function color to alert the operator. The text found within the box changes to specifically describe the challenge. The processes displayed below each of the safety function status boxes are mapped to the six Critical Safety Functions. As previously mentioned, in this embodiment, the Radioactive Waste Management Function, which is not mapped to a specific Critical Safety Function is located on the separate Support System Status Display 98 shown in FIG. 5.

| Safety Function Status Summary Box | Critical Safety Function |
|---|---|
| Fuel Integrity | Subcriticality and Core Cooling |
| RCS Boundary Integrity | Integrity and Inventory |
| Containment Integrity | Containment |
| Secondary Boundary Integrity | Heat Sink |
| Radioactive Waste Management | |

The power production summary consists of those Level 2 functions associated with the Level 1 goal 10: Generate Electricity. The status boxes for each Generate Electricity Level 1 function at the top of the display illustrated in FIG. 5 are designed to indicate the high level status of the major energy processes associated with producing electricity. Each of these functions are displayed as a percentage of their full power values for the appropriate, designed key parameter. Each power production status box is mapped to a representative key plant parameter. The status boxes change color based on specifically defined criteria for each function. The parameter value will also change color based on specific criteria:

| Power Production Summary Boxes | Plant Parameter |
|---|---|
| Generate Heat | Percent of full power indicated by the highest ex-core channel |
| Primary Energy Transport | Percent of full power indicated by primary loop difference in temperature between hot and cold coolant legs |
| Secondary Energy Transport | Percent of full power steam flow calculated from the sum of the individual steam flows for each steam generator |
| Convert Thermal Energy to Work | Percent of full power turbine impulse pressure |
| Convert Shaft Work to Electric Power | Percent of full power megawatts electric |

As previously described, the Level 3 functions associated with the Mass-Energy Transport through the plant defined in FIG. 1 were used to create the display group silhouette or system mimics for the first and second regional display groupings illustrated respectively in FIGS. 3 and 4. Each display group silhouette consists of a colored background and a portion of the working-fluid system schematic. Display space is allocated based on the number of control functions mapped onto a display group silhouette. The display group silhouettes are arranged using the left to right, source to sink organization previously described. This is consistent with the layout of FIG. 1. The most significant difference in the layouts between FIG. 1 and FIGS. 3 and 4 is the location of the display group silhouettes for Environment and Containment Mass And Energy Balance. In this preferred embodiment, in an application to a pressurized water reactor display system, the silhouettes respectively representative of Containment Mass And Energy Balance and of Environment are located on the display shown in FIGS. 3 and 4 to more clearly show the radiation release barrier relationships and to position the Environment Display group silhouette to make it adjacent to sources of both mass and energy releases.

The Reactivity Balance 38 and Fuel Clad Heat Balance 40 are combined in one group because the two functions were found to have a high degree of overlap in control function and supporting information. A colored background, in this example "lavender", is selected that provides an acceptable level of contrast between the background and the display elements. As shown in FIG. 3 a portion of the representation of the reactor vessel is used to provide shape coding to augment the group color coding.

A "misty rose" background is employed for the Primary Mass And Energy Balance region of the display to distinguish from the Reactivity Balance And Fuel Clad Heat Balance region and also provide acceptable contrast levels between the background and display elements. A portion of a representation of the reactor vessel 117, a single primary coolant loop 118, surge line 120, pressurizer 122, and a portion 124 of a single steam generator lower head including reactor coolant pump is used to provide shape coding to augment the group color coding.

The Feedwater Mass And Energy Balance region is shown in FIG. 4 and though not shown, includes a "peach buff" background color to provide differentiation from the surrounding regions and acceptable contrast level between the background and the display elements. The Feedwater Mass And Energy Balance region extends between the two display panels respectively illustrated in FIGS. 3 and 4, which are intended to be seamless and includes a mimic of a main steam line 126, a representation of a single steam generator 128 and a feedwater line 130. The mimic is intended to provide shape coding to augment the group color coding in the same manner employed in the regions previously described.

The Steam Energy Balance region 44b shown in FIG. 4 employs a "linen" background color to differentiate it from the other regions and to provide acceptable contrast levels between the background and display elements. A representation of a single main steam line 126 and main steam line isolation valve 132 is used to provide the shape coding to augment the group color coding.

The Condensate Mass And Energy Balance region 44c shown generally in the center of the display illustrated in FIG. 4 has an "honeydew" background color to distinguish from the surrounding regions and provide acceptable contrast levels. A representation of a condenser 134, condensate line 136 and condensate pump 138 is used to provide the shape coding to argument the group color coding.

A "lavender" background color is designated for the Turbine Control, though not shown in the figures, to provide acceptable contrast levels between background and display elements. Though used previously for the Reactivity Balance Region, it is employed again to illustrate that colors can be repeated, where a limited number of colors are available for this purpose, so long as the corresponding regions that use the same color are substantially spaced from each other. A representation of a portion of a main steam line 126, turbine 140, and turbine shaft 144 is used to provide the shape coding.

The Generator Control region 48 employs an "misty rose" background color. A representation of a turbine shaft 142 and generator 144 is used to provide the shape coding. A "bisque" background color is used in this example to distinguish the Containment Mass And Energy Balance region shown in the right hand portion of FIG. 3. A representation of the containment wall adjacent to the display group is used to provide shape coding. The Environment region 52 is shown on the second panel illustrated in FIG. 4 and employs a white background to distinguish itself and provide acceptable contrast levels. Shape coding to augment the group color coding is not employed for this region. It should be appreciated that the choice of colors is not a limitation of this invention, though preferably in accordance with this invention, adjacent regions should be distinguishable in a manner that is easy for the observer to assimilate. An overview of the layout of the several regions among the three panels of the display can better be appreciated by reference to FIG. 2.

As previously mentioned, the 19 Level 4 functions shown in FIG. 2 define the major control functions for the plant. Information for each of these 19 functions is presented in the plant overview display. The overlay of the individual display elements for each of the display regions can be found in FIGS. 6 and 7. A description of the Level 4 function Control Reactivity region 56 will be employed as an example of how the information to be displayed and the particular display elements were selected for use within the individual regions to display the Level 4 functions.

The Control Reactivity region of the display is shown in the lower left hand portion of FIG. 6 and designated by reference character 56. The function 56 is a grouping of the Control Local Reactivity, Control Gross Reactivity, and Control RCS Boron Concentration Level 4 functions found in FIG. 2. These functions are grouped together because of their interrelationships. The criteria for the display elements and the system/parameters that they apply to, as the same is applied to region 56, is given in the following table:

| Criteria | Systems/Parameters |
|---|---|
| Monitor the satisfaction (and the margin to dissatisfaction) of functional goals. If actuated, monitor the performance of the reactor trip and safeguards functions related to the function. | Ex-core instrumentation-power range, intermediate range, source range, axial flux difference, quadrant power tilt ratio, shut down margin, core axial flux profile. In-core monitoring parameters - kw/ft, DNBR, $\Delta I$, $F_q$, F-$\Delta$-H Rod control system. |
| Maintain awareness of the available processes and systems/components supporting the functional goals. | Plant component boron concentrations. |
| Maintain awareness of the processes and systems/components impacting/influencing the function. | None. |

In the region 56 meters were chosen to display the ex-core power values for the power range, intermediate range, intermediate range SUR (Start-up Rate), source range, and source range SUR. The display for the power range meters is shared with the source range (i.e., once the source range is energized, the power range meters will be replaced with the source range meters). The axial flux difference and quadrant power tilt ratio are also displayed on meters. In addition to the meter indication, if the quadrant power tilt ratio is challenged or violated, the appropriate quadrant will be graphically indicated on the core exit thermocouple map 114 shown in the upper left hand corner of FIG. 6. Although shutdown margin is not a system, the system status box concept is used to indicate whether or not the calculated parameter is satisfied or challenged. The corresponding status block is represented by reference character 148 in FIG. 6. The core axial flux profile and the plant component boron concentration are respectively shown on custom displays. The core axial flux profile is shown on a graphical display 150 and the boron concentration is illustrated on a custom meter 152. Kw/ft, DNBR, $\Delta I$, Fq, and F-$\Delta$-H are all shown by meters 154, 156, 158, 160 and 162. The same type of description can be expanded for the remaining regions fully illustrated in FIGS. 6 and 7. For example, a custom display generally indicated by reference character 166 in the Primary Mass And Energy Balance region 42 is used to show the condition of valves associated with the pressurizer spray, relief valve and heater shown in FIG. 6 and a custom graphic is used to show the status of the cooling tower depicted by reference character 168 in FIG. 7. Though there are a number of approaches that can be employed in configuring a display arrangement, this invention takes the approach of providing functional summary status box displays for both Level 2 and Level 4 functions, along with a specific compilation of key parameters and other supporting displays to understand and assess plant conditions that are contributing to either meeting, challenging, or violating the Level 4 functions and, therefore, the associated Level 2 functions. This is done in a manner that can be readily assimilated by the operator.

These key parameters and displays provide an understanding and assessment of how the Level 4 functions are being satisfied, challenged, or violated before requiring the operators to assess a lower level display to gather more detail as appropriate for the plant conditions and operations, and performance of the process as a result of the subsequent operator actions taken to respond to a plant challenge or violation.

One benefit gained from this design approach for post trip or post safety injection conditions, is that the display provides sufficient key information to allow the operators to visually confirm actions or status in the Emergency Operating Procedures without requiring access to lower level displays, at least initially within some specified bounds or framework. This approach results in capturing all Level 2 and Level 4 functions, along with some specified set of key plant parameters and displays. The design provides a balance between functional and detailed displays. While substantial information is provided, it is provided in a manner that the operator can take advantage of a number of communication tools that enables the information to be readily assimilated and easily absorbed and understood.

The "power production" high level summary status boxes, 16, 18, 20, 22 and 24 include digital displays that use representative measured or calculated parameters, displayed in terms of percent of the full power value. These digital indications provide a more direct comparison of a power generation functions that do not require mental calculations which are often performed by the main control room operators today when making these comparisons. The specific parameter displayed can be selected as preferred for a specific summary box.

One of the more significant concepts applied in this invention is the use of a three-color alerting scheme to differentiate normal conditions and operations from abnormal ones. The color scheme is used for both parameter display elements such as digital displays or display flags on trend displays, and also for component or system display elements such as pumps, valves, and systems or subsystems.

| Color | Meaning |
| --- | --- |
| Green | Normal conditions exist for a parameter of normal operation of a system or component. |
| Yellow | A problem requiring operator action (such as taking manual control of an automatically-controlled temperature control valve) exists that left uncorrected may challenge continuing or successful operation of a component to a system (i.e., outside of the control band and approaching a reactor trip set point). For example, an automatically controlled parameter would appear in yellow when it is outside of the normal control band. |
| Red | A problem exists that has degraded sufficiently to violate a prescribed limit and reach an automatic actuation set point (such as a component or reactor trip point or safety injection set point), that was not maintained by the automatic system and was not corrected by operator action in sufficient time to prevent the automatic actuation. Generally, the red alerting color would be preceded by a yellow alerting color to provide an opportunity to correct the out of normal condition before an automatic actuation occurs. |

Another relatively important concept employed which is related to the use of color coding is to employ a color scheme to differentiate whether systems or components are operating or not. This color scheme is used for component or system display elements such as pumps, valves, and systems or subsystems.

| Color | Meaning |
| --- | --- |
| Standby | A white background color in the system/component block with a thin green (or yellow or red) border. The border color changes, based on the normal conditions prescribed to generate the normal color scheme and the specific limits used to determine when the yellow or red alerting colors are actuated. |
| Operating | A green (or yellow or red) background color in the system/component block. The background color changes, based on the normal conditions prescribed to generate the normal color scheme and the specific limits used to determine when the yellow or red alerting colors are actuated. |

This scheme, in conjunction with the three-color alerting scheme, can be used to determine whether the component or system is operating and whether the conditions are normal or abnormal under the specific circumstances. This combination allows the operator to only focus on malfunctions regardless of whether the component is in operation or standby, and yet provides a scheme to quickly assess whether the component is operating or not.

The display system of this invention also employs smart alarms that not only react to a challenge of set point values associated with the primary function that they're monitoring, but also validate the challenge against other parameters indicative of the status of process operation. For example, a smart alarm would not only look at the operating status of a feedwater pump, but would also consider the state of power operation. An off condition could be appropriate at low power operation, while an alarm would be warranted at full power.

Figure 9:
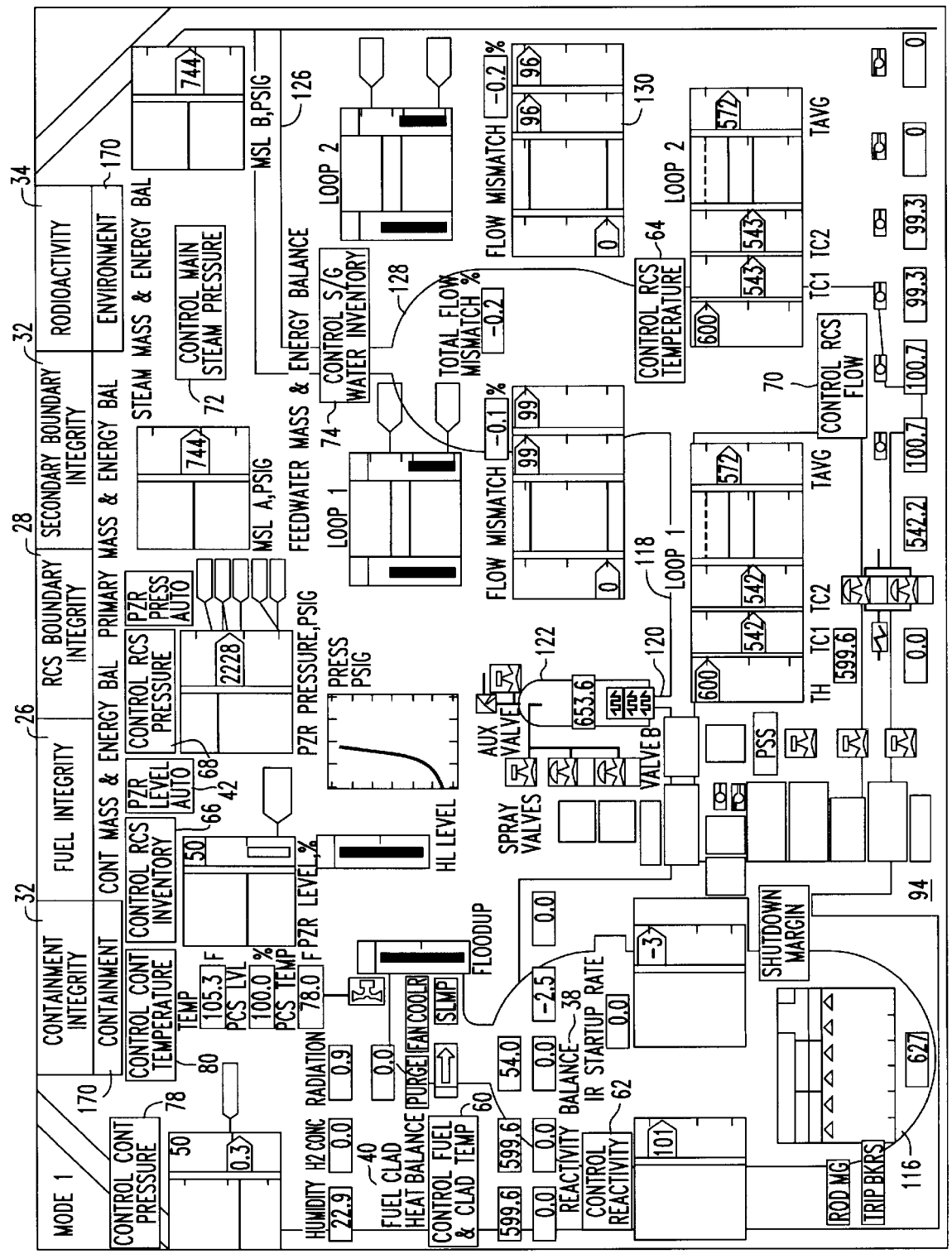
FIG. 9 is a schematic drawing of an alternate embodiment to the display shown in FIG. 6.
Figure 10:
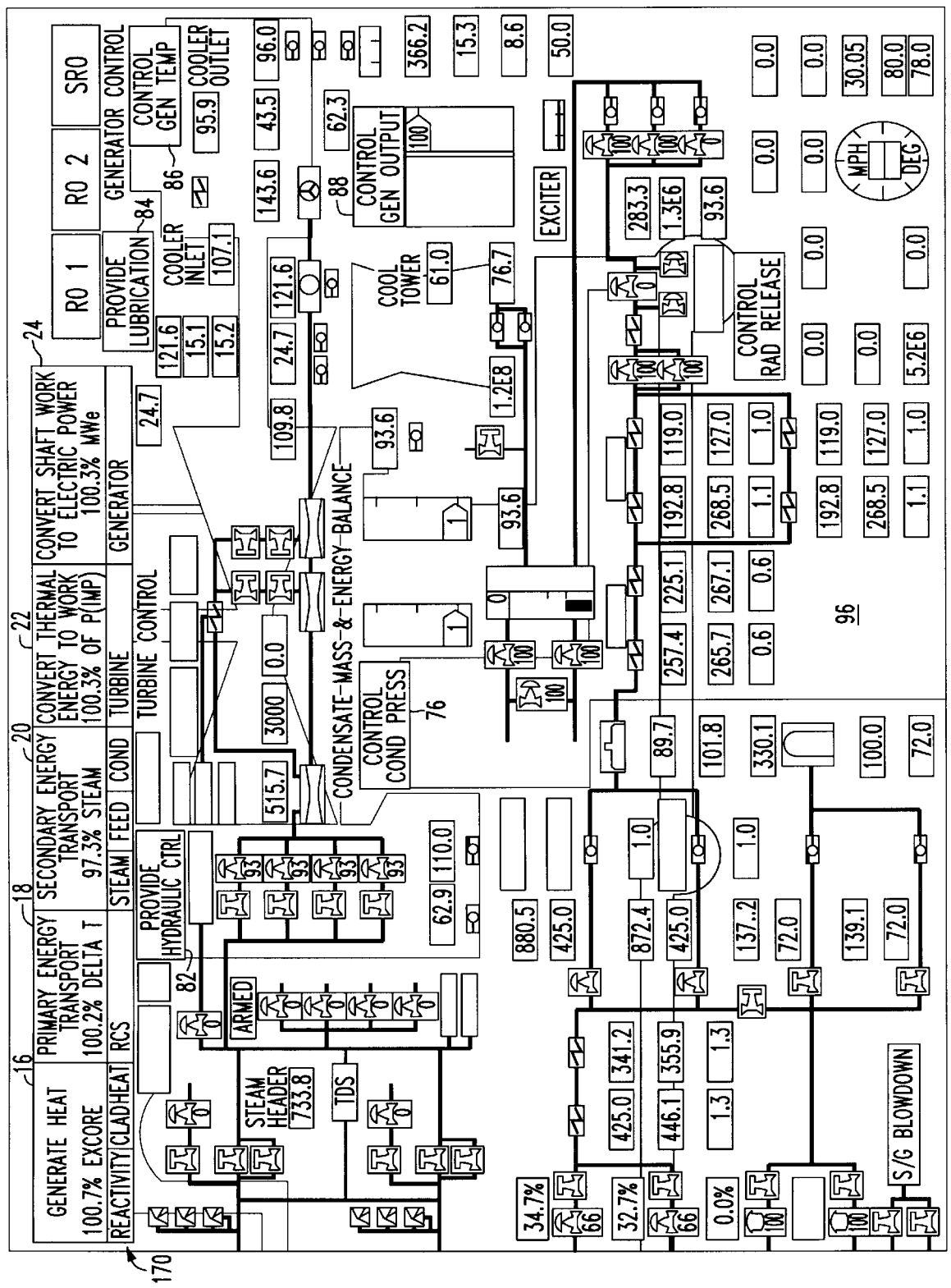
FIG. 10 is a schematic drawing of an alternate embodiment to the display shown in FIG. 7.
Figure 11:
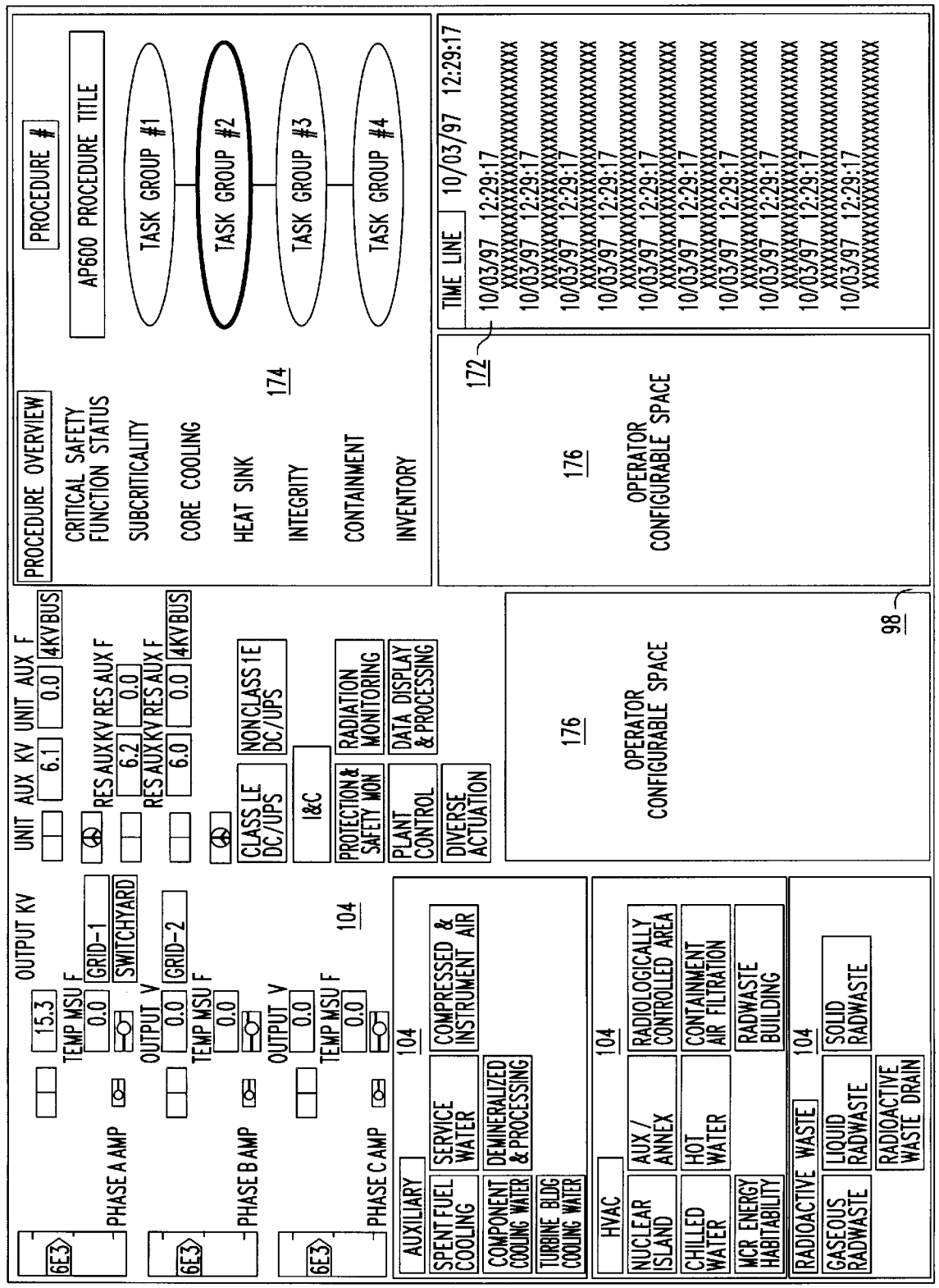
FIG. 11 is a schematic drawing of an alternate embodiment to the display shown in FIG. 8.

FIGS. 9, 10 and 11 illustrate another embodiment of the information display system of this invention and respectively replace the embodiment shown in FIGS. 6, 7 and 8. It should be noted that like reference characters are employed to denote the corresponding display elements among the several figures. The regional displays shown in FIGS. 9 and 10 make enhanced use of the status display boxes, using them to summarize the condition of the Level 3 functions in addition to Levels 2 and 4 as were employed in FIGS. 6 and 7. The Level 3 status boxes are positioned just below the Level 2 status boxes that they pertain to. The Level 3 status boxes 170 take on the color coding of the worst scenario being experience by the Level 4 functions that support it. Thus if any Level 4 function had a red border, its corresponding Level 3 status box would also have a red boarder even if all the other corresponding Level 4 functions were bordered in green. The Level 2 goals on the other hand take on the status of only selected Level 3 functions that they relate to. In the first embodiment illustrated in FIGS. 3, 4, 5, 6, 7 and 8, described previously, the Level 2 status boxes reflect the worst case scenario being identified by the Level 4 and Level 3 annunciators and status boxes corresponding to the Critical Safety Functions. In the second embodiment described with respect to FIGS. 9, 10 and 11, the Level 2 status boxes reflect the worst case scenario being identified by the Level 4 and Level 3 annunciators and status boxes corresponding to the Safety Parameter Display System (SPDS) functions.

| Safety Function Status Summary Box | SPDS Function |
| --- | --- |
| Containment Integrity | Containment Conditions |
| Fuel Integrity | Reactivity Control |
|  | Core Cooling and Heat Removal |
| RCS Boundary Integrity | RCS Integrity |
| Secondary Boundary Integrity | * |
| Radioactivity | Radioactivity Control |

*Note there is not an equivalent SPDS function.

In this embodiment the status of the Critical Safety Functions are shown on the third display Panel 98 illustrated in FIG. 11 in the Procedure Overview section 174. This was done because the Critical Safety Functions become particularly relevant when the process is operating under the Emergency Operating Procedures. .

Referring to FIG. 1 it can be appreciated that under certain process conditions some of the Level 3 processes can pertain to more than one Level 2 goal, and under different process conditions can serve either one or the other of the Level 1 objectives. Thus the same Level 3 process status box can appear on the regional display supporting each goal 10 and 12. However, in the preferred arrangement the status box for any Level 3 process would not appear as active on both regional displays shown in FIGS. 9 and 10 at the same time and would only appear active on the display supporting the objective it was most relevant to under the process conditions being experienced. In the embodiment shown in FIGS. 9, 10 and 11 the Level 4 overlayed display elements have been standardized to add uniformity to the display and enhance its readability. The Level 4 information arranged as shown in FIG. 9 is presented in a manner that is more consistent with the core functional design. Also the more significant components are shown as individual mimics, while the less significant components are grouped into one display element. Even more significantly, a numerical value indicative of the status of the Level 3 functions is tracked, as illustrated in the Feedwater Mass and Energy Balance Field illustrated in FIG. 9 by reference character 74 and the Total Plow Mismatch digital value shown below it. While tracking numerical values for direct process measurements, Level 4, is common and easy to achieve, doing the same for Level 3 functions is unique. In this embodiment the Radioactive Waste Management Level 2 function has also been moved in part to the regional display that it directly supports, shown in FIG. 9. Similarly, other portions of the subregions have been moved to increase the clarity of the presentation. In other respects both embodiments employ the principles previously described.

It was mentioned previously that some of the display elements change, e.g., by changing scaling factors, etc., in different operating modes. In the embodiments shown in FIGS. 9, 10, and 11 other more dramatic changes occur to the display elements, e.g., the mimics, as well, to better communicate functions unique to particular operating modes. Through all these changes maintaining the spatial dedication and relative geographical display arrangement is critical to proper and effective operator use of the wall panel display, and to enhance the transition to conditions beyond power operation. This means that the operators will always find the steam generator information in the same position relative to the reactor coolant system display area for example, even during shutdown conditions when the steam generator is filled and vented with a nitrogen cover gas. Similarly, when the turbine is disassembled and non-operational, the area normally used to display the turbine control and associated Level 4 functions will not be replaced with other displays that disrupt the spatial arrangement. However, the adherence to spatial dedication does not preclude changes to the display to reflect additional functions unique to particular modes of the process. Some minor changes can be shown on the display as it exists. For example, a removed pressurizer relief valve can be shown with an "X" on the appropriate location of the pressurizer mimic, or an open manway on the steam generator can be shown directly by a corresponding open access port. Additional areas, though do have to be provided for illustrating functions unique to certain operating modes, e.g., refueling, where it is desirable to show a plan view of the core above the refueling cavity display to identify which fuel assemblies are removed, which are lifted, which fuel assemblies are in the fuel transfer canal, etc. It is also desirable to show the status of the Reactor Head, Control Rod Drive Mechanism Upper and Lower Internals. These additional areas need only be displayed during the relevant modes of process operation.

Desirably, the reactor plant operators should be able to communicate from their own workstations to the display information system of this invention to pop up different fields not currently highlighted on the display or to acknowledge when a recommended pop up is prompted by the information display system. This invention accomplishes that objective by employing a unique cursor for each plant operator that is individually and respectively manipulated at the workstations. The cursor is operable to manipulate the functions actionable from the workstation while maintained within the region of the workstation screen. If the operator manipulates the cursor to a selected region outside of the workstation screen, e.g., above the screen, then the cursor jumps to the wall panel of the display system of this invention and is operable to manipulate the functions actionable from the wall panel. Some of the functions actionable from the wall panel can manipulate the display on the workstation screen as well. This approach enhances awareness of each operators focus of attention whenever the cursor is on the information display system. An alternate approach is a one to one mapping of display manipulation devices to the displays.

During normal operation, a manual display element view procedure is used. The display element view change is driven by the Computerized Procedure System logic and acknowledged via a pop up pick list. Additionally, manual activation of the pop up pick list is also provided. During abnormal operation (post trip/SI) automatic display element view changes are controlled by the Reactor Trip/Safety Injection logic. Display element view change requests, including the display of pop up trend or supplementary information, are assessed via poke fields or active display elements. Operator work space utilization in the operator's configurable space shown in FIGS. 2, 5 and 8, is driven using pop up pick lists as well.

Navigation between the information display system and the operator's workstation displays are accomplished via poke fields and/or active display elements. The following are examples of links between the information display system of this invention and the operator's workstation displays:
● Alarm flag to alarm support display;
● Functional display element to functional display (e.g., Level 4 function box to functional display);
● Physical display element to physical display;
● System status display to physical display
● Time line to electronic log book.

Access to a pop up pick list is advantageous when one information display system display element is linked to multiple operator workstation displays or multiple supporting information displays. The display change should be accommodated by a reconfiguration of the soft control interface to support the display selected.

The most visible identification of an operator's current focus of attention is the position of the individual operator's cursor on the information display system. Therefore, each operator's cursor should be unique to facilitate rapid identification. Under certain circumstances conflicts may arise with respect to the manipulation of the information display system display elements. Simultaneous operator requests for additional information about different display elements in the same display poses no conflict—the information is displayed at each operator's workstation. Similarly, simultaneous operator requests for additional information about the same display element poses no conflict, the information is displayed at the operator's workstation. However, simultaneous operator requests for different information display system views of the same display element or different display modes pose a conflict. In such situations the current view or display mode should be maintained to prompt a discussion between the operators regarding their information needs or a priority can be assigned to the Senior Operator's request.

Thus, this invention takes advantage of a number of high level arrangement concepts, e.g., left to right prioritization; top to bottom prioritization; silhouette shapes that correspond to major components for Level 3 groupings; Level 4 functions within each grouping area sectioned from the other areas through the use of sectioning borders; power production summary boxes employing percentage of full power values; and multiple levels of color coding to ease operator assimilation of the information and make it readily understandable. In addition, this invention configures the information by objectives following the logical flow of functions which must necessarily be controlled to achieve those objectives.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Accordingly, suitable modifications and equivalents may be resorted to and still fall within the spirit and scope of this invention.

What is claimed is:

1. An information display system for managing the operation of a complex process, the system comprising:
   screen for displaying process goals (Level 2);
   a plurality of separate regional displays associated with the Level 2 goals for displaying process functions (Level 3) which must be substantially maintained in order to achieve the associated Level 2 goals for operating the process; and
   a display of control functions (Level 4) related to a Level 3 process function and its associated Level 2 goal mapped onto the regional display.

2. The information system of claim 1 further comprising display elements overlaying the regional displays for displaying specific process parameters, process alignments, supporting system status and/or alarms for evidencing the state, direction or trend of the associated Level 4 functions.

3. The information system of claim 2 wherein one of the overlaying display elements is prominent at a time under most operating conditions.

4. The information system of claim 3 wherein only one of the overlaying display elements is prominent at a time under most operating conditions.

5. The information system of claim 3 wherein the overlaying display elements pertaining to the Level 4 functions associated with the corresponding Level 3 process and Level 2 goal, that are either approaching or experiencing an abnormal condition, are displayed prominently.

6. The information system of claim 2 including status display elements for summarizing the condition of at least a plurality of the Level 3 functions, wherein the status conditions of the Level 3 functions correspond to the worst case condition of the Level 4 processes supporting it.

7. The information system of claim 6 including status display elements for summarizing the condition of at least a plurality of the Level 2 goals, wherein the status conditions of the Level 2 goals correspond to the worst case condition of a subset of the Level 4 functions supporting it.

8. The information system of claim 7 wherein the subset of Level 4 processes correspond to the processes supporting the Critical Safety Functions.

9. The information system of claim 7 wherein the subset of Level 4 processes correspond to the processes supporting the Safety Parameter Display System functions.

10. The information system of claim 2 wherein the majority of the display elements change with corresponding changes in process conditions and the changing displays provide indications of at least two indicia of the subject matter that they respectively present.

11. The information system of claim 10 wherein at least one of the indicia is provided using color coding.

12. The information system of claim 2, wherein the process has a plurality of modes and wherein at least one of the display elements automatically changes when the process transitions from one given mode to another.

13. The information system of claim 12 wherein the changing display element changes scale at a point in time in the transition.

14. The information system of claim 12 wherein the changing display element changes form at a point in time in the transition.

15. The information system of claim 1 wherein at least one of the regional displays include a mimic of a major process component.

16. The information system of claim 15 wherein at least two of the regional displays include a mimic of a major process component.

17. The information system of claim 15 wherein the mimic is color coded to identify the condition of the portion of the process associated with the mimic.

18. The information system of claim 15 wherein the mimic is color coded to identify the operating status of a component.

19. The information system of claim 1 comprising:
   a first display region for displaying process goals (Level 2) related to a first process objective (Level 1) directed to a product of the process; and
   a second display region for displaying process goals (Level 2) related to a second process objective (Level 1) directed to the integrity of the process.

20. The information system of claim 19 for operating a nuclear plant for generating electrical power, wherein the first process objective is to generate electricity and the second process objective is to prevent the release of radiation.

21. The information system of claim 20 wherein:
   the first regional display presents process information relating to goals (Level 2) comprising heat generation, primary energy transport, secondary energy transport, conversion of thermal energy to work and conversion of work to electric energy; and;
   the second regional display presents process information relating to goals (Level 2) comprising fuel integrity, reactor coolant system boundary integrity, containment integrity and secondary boundary integrity.

22. The information system of claim 21 wherein the second regional display also presents process information relating to the Level 2 goal Radioactive Waste Management (Radioactivity).

23. The information system of claim 21 wherein the first regional display presents the corresponding Level 2 goals as a percentage of full power operation.

24. The information system of claim 20 wherein the nuclear plant is a pressurized water reactor.

25. The information system of claim 20 including a third regional display for presenting information on a support system's status.

26. The information system of claim 25 wherein the third regional display presents information relating to primary boundary corrosion control and secondary boundary corrosion control.

27. The information system of claim 25 wherein the third regional display presents information relating to radioactive waste management, a goal (Level 2).

28. The information system of claim 25 including a third regional display that presents operator configurable information.

29. The information system of claim 25 including a third regional display that presents a procedure overview.

30. The information system of claim 29 wherein the process overview includes an indication of the status of the Critical Safety Functions.

31. The information system of claim 25 including a third regional display that presents a process timeline.

32. The information system of claim 1 including means for prompting the operator to acknowledge that a change to at least one of the displays is appropriate and upon receipt of the acknowledgment replacing the corresponding display with an alternative and mutually exclusive display appropriate to the process condition.

33. The information system of claim 32 wherein the system prompts the operator for a display change during normal operation and automatically makes the appropriate display change when an abnormal defined event occurs.

34. The information system of claim 33 wherein that abnormal defined event is set forth in an emergency operating procedure of the nuclear plant.

35. The information system of claim 1, further comprising an operator work station operatively connected with the information display system and means for navigating between the display system and the information available at the work station.

36. The information system of claim 35 wherein one cursor coordinates the display system and the operator work station.

37. The information system of claim 35 wherein the operator work station includes a cursor that is operable to coordinate the information presented on a screen on the operator workstation when the cursor is maintained within the field of the screen and means for moving the cursor within the field of the screen and to a given region outside the field of the screen where the cursor transfers to the display system and coordinates the information presented on the display system.

38. The information system of claim 35 including a plurality of operator work stations operatively connected with the screen and wherein the means for navigating between the screen and the information available at the respective work stations comprises a unique cursor for each work station.

39. The information system of claim 38 wherein each of the unique cursors has a priority ranking which controls the priority of which command takes precedence when mutually exclusive commands are initiated within in a preset time period.

40. The information system of claim 35 including means for enabling the operator to point to an area on the screen and activate a mechanism that presents more detailed information on the operator's workstation corresponding to the area pointed to on the screen.

41. The information system of claim 1 wherein at least some of the displays are presented as text on a background within a border where the background of the text is color coded to signify a first indicia of the subject matter represented by the display.

42. The information system of claim 41 wherein the border is color coded to identify a second indicia of the subject matter represented by the display.

43. The information system of claim 1 wherein at least some of the displays are presented as text within a border where the border is color coded to signify an indicia of the subject matter represented by the display.

44. The information system of claim 1 wherein the process goals are continuously displayed.

45. The information system of claim 1 for displaying information for observing the condition of the process including separate means for controlling the process.

46. The information system of claim 2 wherein the display regions change with the change of at least one mode of operation to another so that display elements relevant to the current mode of operation are prominent.

47. The information system of claim 46 wherein the display elements not relevant to the current mode of process operation are subdued.

48. The information system of claim 2 wherein the Level 4 display elements are positioned on the display in proximity to the mimic of components that they relate to and are organized consistent with their interrelationships in the core functional design.

49. The information system of claim 2 wherein at least some of the Level 4 alarms are dependent on variable set points that change dependent on the state of other Level 4 processes.

50. The information system of claim 2 wherein at least certain types of information about some of the Level 4 functions are grouped into a first category comprising more significant Level 4 function information and certain other types of information about some of the Level 4 functions are grouped into a second category comprising less significant types of Level 4 function information and wherein the types of Level 4 function information in the first category are displayed respectively by separate display elements and the types of Level 4 function information in the second category are displayed grouped together.

51. The information system of claim 2 wherein the status of at least one of the Level 3 processes is displayed as a numerical value.

52. A method of presenting information on the status of a complex process comprising the steps of:

dissecting the complex process into the top level objectives (Level 1) to be achieved by the process, the goals (Level 2) that have to be achieved in support of the Level 1 objectives, the intermediate processes that have to be to undertaken (Level 3) to meet those Level 2 goals, and the functions that have to be controlled (Level 4) in support of the Level 3 processes;

organizing the information about the complex process in a plurality of regions on a display;

grouping substantially all the primary information in direct support of each Level 1 objective in corresponding separate regions on the display;

presenting information pertaining to the Level 3 processes in subregions proximate to a display of the status of the corresponding Level 2 goals; and displaying the Level 4 functions substantially within the corresponding Level 3 subregions.

* * * * *